United States Patent [19]
Elkind

[11] Patent Number: 6,002,517
[45] Date of Patent: Dec. 14, 1999

[54] FLAT, HANDS-FREE, CONVERTIBLE KEPLERIAN BINOCULARS

[76] Inventor: Solomon Elkind, 15256 SW Millikan Way, Apt. 325, Beaverton, Oreg. 97006

[21] Appl. No.: 09/040,198

[22] Filed: Feb. 27, 1998

Related U.S. Application Data
[60] Provisional application No. 60/038,045, Mar. 6, 1997.

[51] Int. Cl.⁶ .................................................. G02B 23/00
[52] U.S. Cl. ...................... 359/409; 359/421; 359/431; 359/480
[58] Field of Search .................................. 359/402, 404, 359/407, 409, 410, 419, 421, 431, 480, 481; 351/158

[56] References Cited

U.S. PATENT DOCUMENTS

| | | |
|---|---|---|
| 1,610,553 | 12/1926 | Jones ........................................ 359/419 |
| 2,710,560 | 6/1955 | Thompson ................................ 359/431 |
| 3,409,343 | 11/1968 | Zapp ......................................... 359/431 |
| 3,865,468 | 2/1975 | Holcomb .................................. 359/481 |
| 4,704,000 | 11/1987 | Pekar et al. .............................. 359/482 |
| 4,795,235 | 1/1989 | Spitzberg ................................. 359/404 |
| 5,028,127 | 7/1991 | Spitzberg ................................. 351/158 |
| 5,321,547 | 6/1994 | Zapp ......................................... 359/431 |

*Primary Examiner*—Cassandra Spyrou
*Assistant Examiner*—Mark A. Robinson

[57] ABSTRACT

Binoculars which are flat in the direction of view include two powerful Keplerian telescopes placed in two flat containers covering each eye and held by an eyeglass frame resting on the nose and ears; the binoculars can be easily converted into magnifying reading eyeglasses by touching a knob on the temple side of each telescope.

6 Claims, 4 Drawing Sheets

FLAT, HANDS-FREE, CONVERTIBLE KEPLERIAN BINOCULARS

REFERENCE TO RELATED APPLICATIONS

This patent application is a continuation of my provisional patent application 'Flat, Hands-Free, Convertible Keplerian Binoculars' filed by PTO on Mar. 6, 1997 with application Ser. No. 60/038,045.

The structure of proposed binoculars, the optical diagram, optical components and their position and orientation are unchanged.

BACKGROUND OF THE INVENTION

The purpose of this invention is to replace existing magnifying eyeglasses by more convenient and cosmetically attractive devices. The magnifying eyeglasses improve vision for the many millions of low vision persons, including those suffering from macular degeneration.

Existing binoculars intended as low vision aids are not perfect. The Galilean type binoculars have a narrow (about 5 degrees) field of view and aberrations at the edge of the field. Existing Keplerian low vision binoculars have good optical performance but they are bulky and heavy, projecting as much as three to four inches from the eye. Some devices provide the conversion of far distance binoculars into magnifying reading glasses by putting so called reading caps on the objective lenses which enables reading, but with rather small depth of sharpness.

This invention overcomes the aforementioned problems with a new type of Keplerian binoculars, each half of which is 18 mm thick (in the direction of view) and just covers the eye of the user. The whole binoculars' appearance is similar to the appearance of sunglasses. The design is lightweight, comfortable to wear on the nose and ears. The binoculars have a front aperture of 24 mm and enable both near and far vision with high resolution.

A special feature of the device is its convertibility. Just touching the knob on each temple side converts the far distance binoculars into magnifying reading eyeglasses. For instance, a user, during a lecture, will be able to see the blackboard and after a quick click, be able to read his/her notebook.

SUMMARY OF THE INVENTION

The invented binoculars have two telescopes hidden in two flat containers 18 mm thick and 60 mm in diameter, covering each eye. The containers are attached to a spectacle frame. This makes the appearance of binoculars similar to that of sunglasses, as shown in FIG. 1. The binoculars are light, and the weight is distributed close to the forehead, enabling a standard eyeglass frame to be used.

Placing telescopes in small flat containers is possible because of the special optical diagram of the telescopes. The axis of the objective lens (2) and the axis of the eyepiece field lens (7) are vertical, perpendicular to the vision axis, as shown in FIG. 2. The needed long optical path from the objective lens to the eyepiece is formed by four flat mirrors positioned at 22.5 degree angle to the beam.

Conversion from far distance binoculars to magnifying reading eyeglasses without changing the magnification is accomplished by using an additional plus lens (10) inserted approximately in the middle of the optical path. This method provides at least twice larger depth of sharpness than reading cups put on the objective lens. The additional converting lens (10) is driven by a spring mechanism with a knob on the temple side of the telescope.

Despite the small dimensions, the binoculars are really powerful. The front aperture is 24 mm, magnification is 6x, the field of vision is 9 degrees, the angular resolution is 20 angular seconds. The optical system is completely corrected chromatically: the objective lens and the eyepiece field lens are achromatic.

Focusing for the far vision range, from 2 yards to infinity, and also for the reading distance range is performed by rotating the focusing wheel on the temple side of each telescope.

The binoculars can be redesigned for varying degrees of magnification with corresponding changes in the field of vision.

BRIEF DESCRIPTION OF THE DRAWINGS

The Summary of the Invention and Detailed Description of Preferred Embodiments are illustrated in the actual size drawings.

DETAILED DESCRIPTION OF PREFERRED EMBODIMENTS

Figure 1:
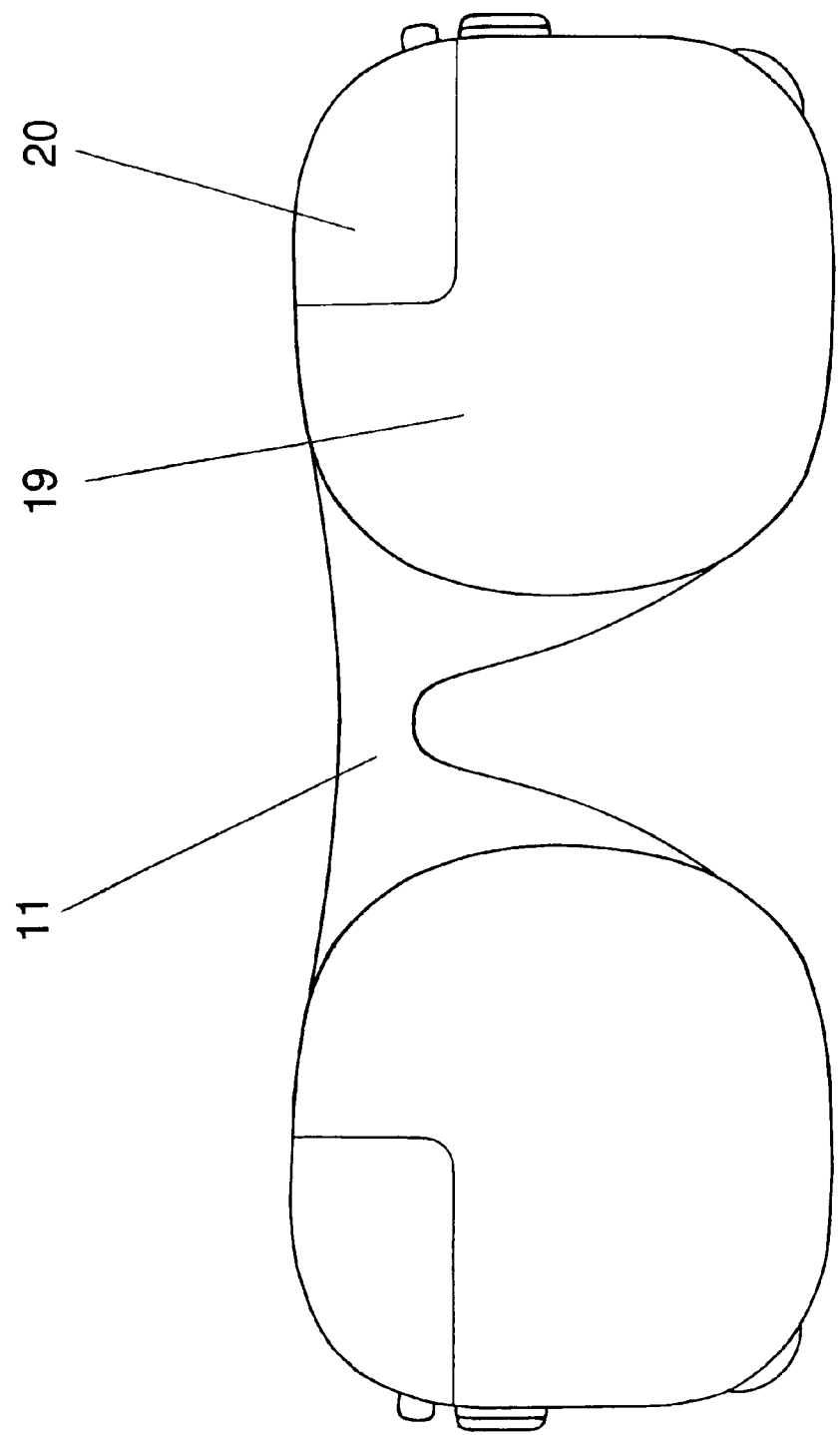
FIG. 1 is a front view of the binoculars.
Figure 2B:
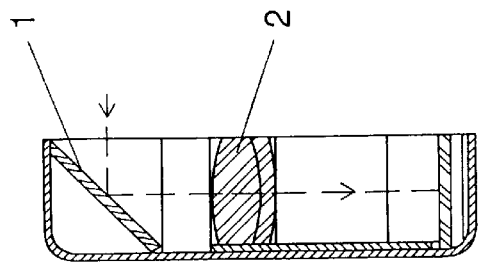
FIG. 2B is a sectional view taken along line 2B—2B of FIG. 2.
Figure 2:
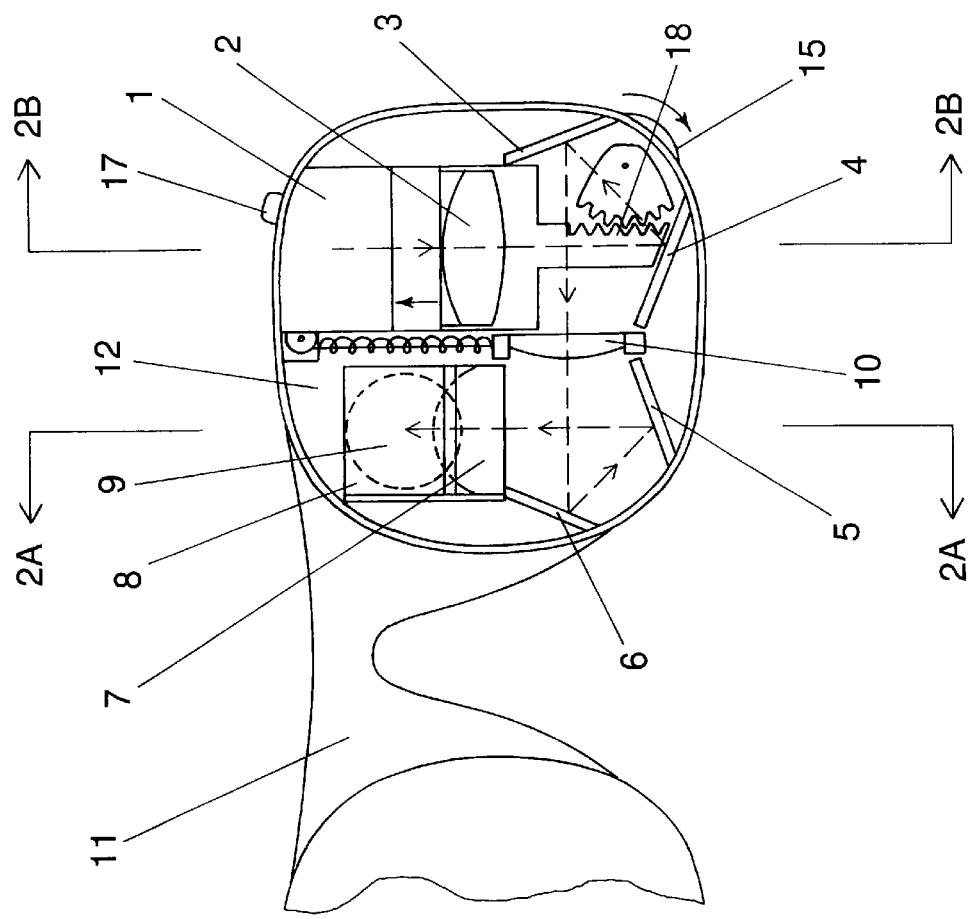
FIG. 2 is a front view of one telescope with removed front cover.
Figure 2A:
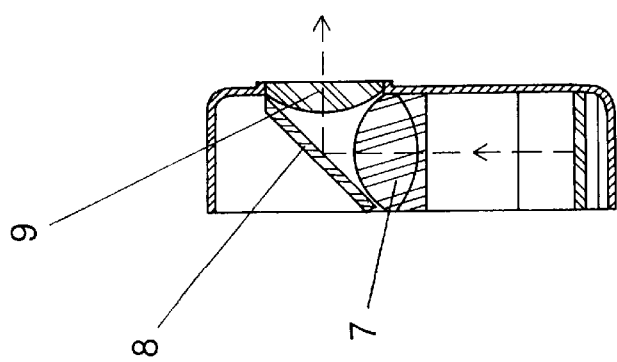
FIG. 2A is a sectional view taken along line 2A—2A of FIG. 2.

FIGS. 1 and 2 illustrate the invented flat binoculars. They consist of two Keplerian telescopes mounted on the spectacle frame (11). Each telescope has a light, rigid framework (12), so small that it covers the wearer's eye in the manner of ordinary eyeglasses. In the thickness of each telescope, an achromatic objective lens and a special type of Koellner eyepiece are placed. The beam path begins at the entrance planar mirror (1) inclined at 45 degrees to the front plane of the telescope. From the entrance mirror the light beam travels through the objective lens (2) which has a vertical axis. The purpose of this design is to reduce the thickness of the whole device: the thickness of the objective lens is not added. The objective lens is achromatic and has an aperture of 24×16 mm.

The eyepiece is specially designed to attain the compensation for the residual chromatic aberration of the objective lens as well as to provide the required magnification, size and position of the exit pupil. This eyepiece of special Koellner type is properly short, it consists of the achromatic field lens (7) with 30 mm focal length, the plano-convex eye lens (9), and the plane mirror (8) inclined at 45 degrees to the axis of the lens (7) and to the axis of the eye lens (9). The placement of the achromatic lens as the field lens is uncommon in the Koellner eyepiece where the eye lens is usually achromatic. The used diagram enables the eyepiece to be made shorter.

The incidental light reflected by the entrance mirror (1) passes through the objective lens (2) and then travels around the perimeter of the framework to the eyepiece, directed by four plane mirrors (3), (4), (5) and (6). The mirrors (3), (4), (5) and (6) are parallel to the vision axis of the eye and inclined at 22.5 degrees to the beam path, they form the reflecting system that works as two pentaprisms. But a pair of mirrors is preferred over a pentaprism, because the mirrors make the whole geometrical beam path shorter and can fit into the small size of the telescope. If the length of the geometrical path in the prism is L and the refractive index of the glass is N=1.5, the use of the prism causes the significant increase of the length of the beam path from the objective lens to the pupil by the amount:

$$L(N-1)/N = L/3$$

Figure 3A:
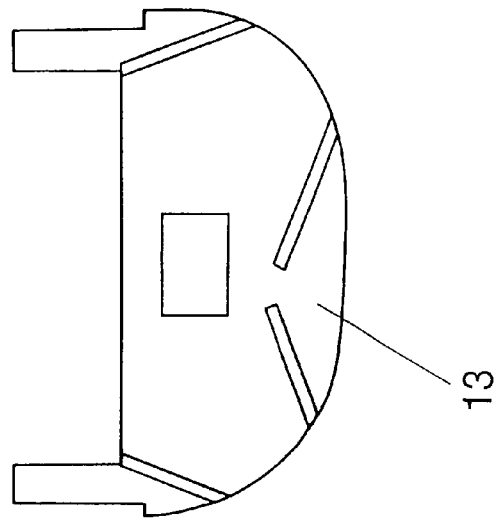
FIG. 3A shows the plate with four mirrors.
Figure 3:
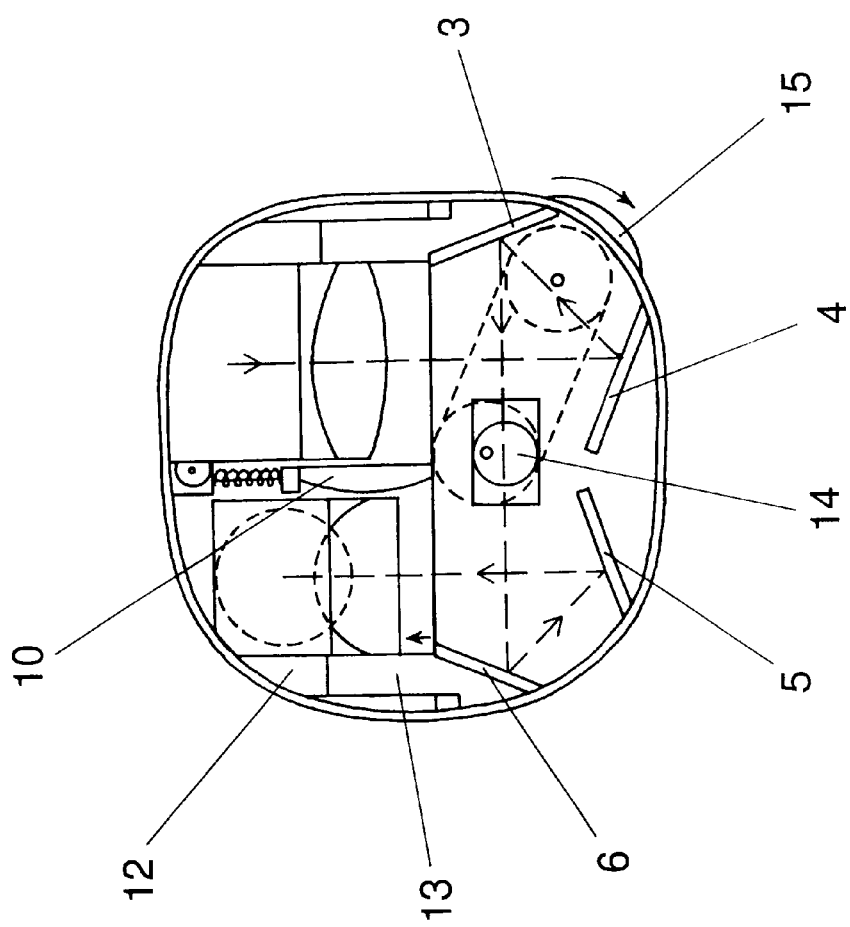
FIG. 3 shows the eccentric mechanism that moves a plate with four mirrors.

Focusing of the telescope can be accomplished by moving a plate with the four mirrors (3), (4), (5), (6) along the objective axis. An alternative way of focusing is moving the objective lens instead of the reflecting system. As shown in FIG. 3, the plate (13) with the four mirrors can be driven by the eccentric (14) connected with the wheel (15) on the temple side of each telescope. FIG. 2 shows the rack-and-pinion focusing mechanism (18) moving the objective lens.

Besides the distance range for far vision, the telescope has the second distance range for reading and detailed work. The commutation of ranges is made by inserting the +10 diopter lens (10) between the two pairs of mirrors in the reflecting system. The converting +10 diopter lens (10) is driven up and down by a spring mechanism with a knob on each telescope. The depth of sharpness in the reading position is more than 30 mm. The versatility of the invented binoculars is important for a low-vision person who needs assistance for both close-up and far vision.

Figure 4:
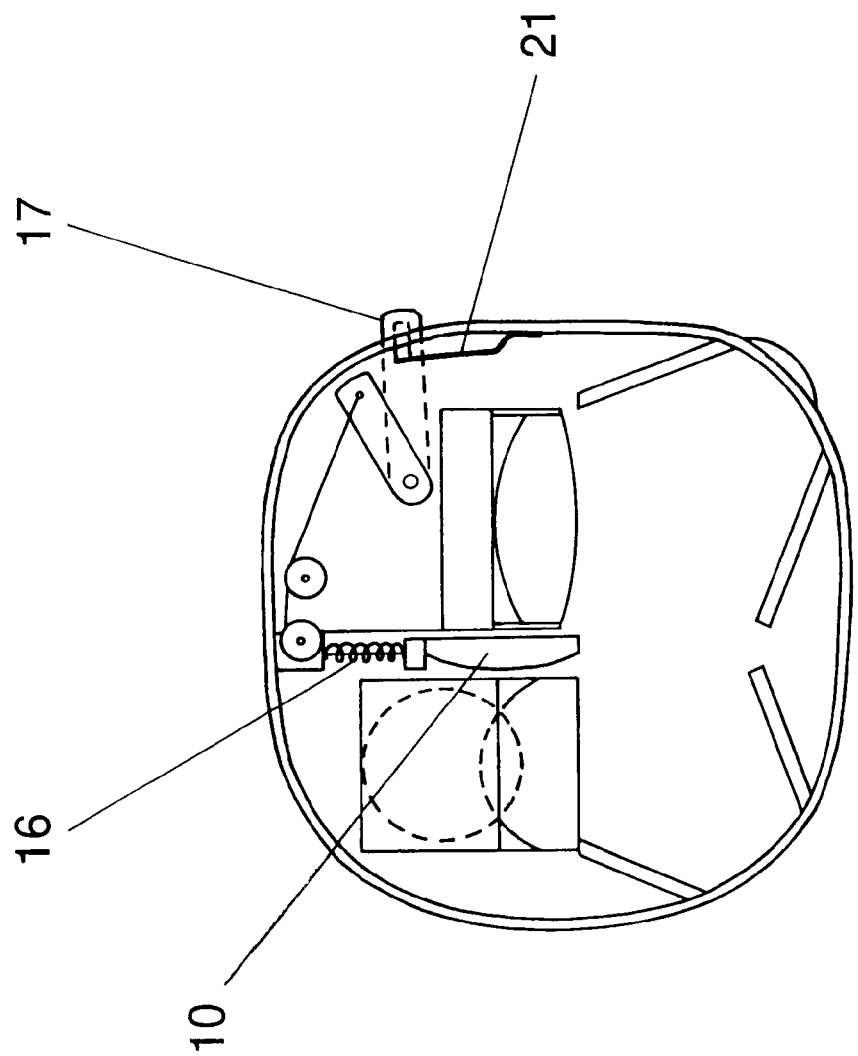
FIG. 4 shows the structure of the spring mechanism that moves the converting lens. (The entrance mirror (1) and the rack-and-pinion (18) are removed).

The rack-and-pinion mechanism shown in FIG. 2, the eccentric mechanism depicted in FIG. 3, and the spring mechanism shown in FIG. 4 are not involved in the claims of the invention and can be improved.

The converting lens (10) in FIG. 4 is pulled by a thin belt stretched on two pulleys and is pushed back by the spring (16). The knob (17) on the temple side of binoculars pulls the belt and is stopped by the stopper flat spring (21). The stopper is released by the pin inside the knob (17).

The front cover (19) of each telescope (in FIG. 1) is opaque except the transparent sector (20) glued into the plastic cover (19). This transparent sector transmits light to the entrance mirror (1). Because the mirror is inclined at 45 degrees to the vision axis, this sector looks dark.

Each telescope is attached to the frame (11) with screws. It allows the selection of a frame size appropriate to a user's pupil distance.

Some features of the present invention are similar to those of the pocket telescope of U.S. Pat. No. 5,321,547, but there are significant differences in design and application. The invented binoculars contain two telescopes; each of them just covers the eye and is twice smaller than the existing pocket telescope because of the different optical diagram. Despite the small overall size each invented telescope has the aperture area 4 times larger than the mentioned pocket telescope. Other advantages of the present invention are: comfortable to wear (like eyeglasses), hands-free, two operating modes.

What is claimed is:

1. Binoculars which are generally flat in a direction of view, comprising two Keplerian telescopes in two flat containers attached to a spectacle frame, each said telescope is to be located in front of an eye socket of a user, each said telescope includes an objective and an eyepiece and has a folded optical path directed by four planar mirrors between the objective and the eyepiece, each said telescope has an entrance planar mirror turned at 45 degrees to a vision axis of the user, each said telescope has a means for selectively inserting and removing a converting lens into and from the optical path between the objective and the eyepiece in order to allow a user to convert said binoculars into reading magnifying eyeglasses without changing the magnification.

2. Binoculars according to claim 1, wherein each said telescope has a thickness not larger than 18 mm measured along the vision axis from the front edge of said entrance planar mirror to the last surface of the eye lens in the eyepiece, each said telescope has the objective lens with a horizontal dimension not less than 24 mm, each said telescope has a magnification not less than 6x, and the product of the magnification value multiplied by field of view angle in degrees is not less than 50.

3. Binoculars according to claim 1, wherein the objective and the eyepiece, in each said telescope, are chromatically corrected.

4. Binoculars according to claim 1, wherein each said telescope includes said entrance planar mirror turned at 45 degrees to the vision axis and at 45 degrees to the objective lens axis.

5. Binoculars according to claim 1, wherein all four said planar mirrors directing the optical path between the objective and the eyepiece, in each said telescope, are parallel to the vision axis and inclined at 22.5 degrees to the beam path.

6. Binoculars according to claim 1, wherein each said telescope includes said converting lens which is a positive lens stored in a provided space between the objective and the eyepiece, said converting lens has a focal length longer than the distance between said converting lens and the objective lens and is insertable into the optical path close to the middle point of said optical path by mechanical means in order to change the range of said telescope from far vision to reading distance vision.

\* \* \* \* \*